(12) United States Patent
Kim et al.

(10) Patent No.: US 10,401,602 B2
(45) Date of Patent: Sep. 3, 2019

(54) EUV LIGHT GENERATOR INCLUDING COLLECTING MIRROR HAVING DRIP HOLE

(71) Applicant: SAMSUNG ELECTRONICS CO., LTD., Suwon-si, Gyeonggi-do (KR)

(72) Inventors: Hoyeon Kim, Seoul (KR); Seongsue Kim, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 649 days.

(21) Appl. No.: 15/172,390

(22) Filed: Jun. 3, 2016

(65) Prior Publication Data
US 2017/0059837 A1    Mar. 2, 2017

(30) Foreign Application Priority Data
Aug. 31, 2015   (KR) .......................... 10-2015-0122923

(51) Int. Cl.
*G02B 19/00*    (2006.01)
*H05G 2/00*    (2006.01)
*G21K 1/06*    (2006.01)

(52) U.S. Cl.
CPC ..... *G02B 19/0019* (2013.01); *G02B 19/0095* (2013.01); *G21K 1/062* (2013.01); *H05G 2/005* (2013.01); *H05G 2/008* (2013.01)

(58) Field of Classification Search
CPC .... B82Y 10/00; G02B 5/0891; G02B 5/0825; G02B 5/0833; H05G 2/005; H05G 2/008; H05G 2/003; H05H 1/06

USPC ...... 250/504 R, 365, 492.1, 493.1, 372, 431, 250/492.2, 503.1; 355/67, 77; 359/359, 359/587; 378/119
See application file for complete search history.

(56) References Cited

U.S. PATENT DOCUMENTS

| | | | |
|---|---|---|---|
| 6,780,496 B2 | 8/2004 | Bajt et al. | |
| 6,972,421 B2 | 12/2005 | Melnychuk et al. | |
| 7,920,323 B2 | 4/2011 | Benoit et al. | |
| 8,317,929 B2 | 11/2012 | Rakhimova et al. | |
| 8,536,550 B2 | 9/2013 | Asayama et al. | |
| 8,686,370 B2 | 4/2014 | Bowering et al. | |
| 8,841,641 B2 | 9/2014 | Kakizaki et al. | |
| 8,884,257 B2 | 11/2014 | Nagai et al. | |
| 2010/0039632 A1 | 2/2010 | Van Herpen | |
| 2013/0126761 A1* | 5/2013 | Nagai ................... | H05G 2/005 250/504 R |

(Continued)

FOREIGN PATENT DOCUMENTS

JP   2007-134166 A   5/2007

*Primary Examiner* — David A Vanore
(74) *Attorney, Agent, or Firm* — Lee & Morse, P.C.

(57) ABSTRACT

An extreme ultraviolet (EUV) light generator includes a collecting mirror having a first focal point and a second focal point, the first focal point being closer to the collecting mirror than the second focal point, a laser to generate a laser beam and to radiate the laser beam toward the first focal point of the collecting mirror, and a droplet generator to generate a droplet and to discharge the droplet at the first focal point of the collecting mirror, wherein the collecting mirror includes a concave reflective surface, a through hole in a center of the reflective surface, and a drip hole between the through hole and an outer circumferential surface of the reflective surface.

19 Claims, 14 Drawing Sheets

(56) References Cited

U.S. PATENT DOCUMENTS

2013/0319466 A1* 12/2013 Mizoguchi .......... G03F 7/70925
  134/18
2015/0055108 A1   2/2015 Huber et al.
2017/0059837 A1* 3/2017 Kim .................. G02B 19/0019

* cited by examiner

EUV LIGHT GENERATOR INCLUDING COLLECTING MIRROR HAVING DRIP HOLE

CROSS-REFERENCE TO RELATED APPLICATION

Korean Patent Application No. 10-2015-0122923, filed on Aug. 31, 2015, in the Korean Intellectual Property Office, and entitled: "EUV Light Generator Including A Collecting Mirror Having A Drip Hole," is incorporated by reference herein in its entirety.

BACKGROUND

1. Field

Embodiments relate to an extreme ultraviolet (EUV) light generator of a laser produced plasma (LPP) type, and more particularly, to an EUV light generator including a collecting mirror having a drip hole, and a blocking bar.

2. Description of the Related Art

An extreme ultraviolet (EUV) light generator of a laser produced plasma (LPP) type applies a target material in a droplet state with a laser to generate plasma, thereby generating EUV light. Since the target material in the droplet state is in a liquid state, the target material can remain inside the EUV light generator to degrade the efficiency of EUV light generation, and contaminate several configuration elements of the EUV light generator. In order to improve the efficiency of EUV light generation of the EUV light generator, a residue of the target material remaining inside the EUV light generator should be removed.

SUMMARY

Embodiments provide a photolithography apparatus using elements capable of effectively removing a contaminated material in an extreme ultraviolet (EUV) light generator, a collecting mirror, an EUV light generator, and EUV light.

Embodiments provide a collecting mirror having a drip hole, a reservoir, heaters, gas blowing units, and/or vibrators.

Embodiments provide an EUV light generator including a blocking bar having a vertically long shape.

Embodiments provide an EUV light generator including a field mirror having a first blind region in the center of the field mirror and a second blind region in an upper portion thereof.

In accordance with an aspect of embodiments, an EUV light generator includes a collecting mirror having a first focal point and a second focal point, the first focal point being closer to the collecting mirror than the second focal point, a laser to generate a laser beam and to radiate the laser beam toward the first focal point of the collecting mirror, and a droplet generator to generate a droplet and to discharge the droplet at the first focal point of the collecting mirror, wherein the collecting mirror includes a concave reflective surface, a through hole in a center of the reflective surface, and a drip hole between the through hole and an outer circumferential surface of the reflective surface.

In accordance with another aspect of embodiments, an EUV light generator includes a collecting mirror including a reflective surface configured to be concave, a first hole in a center thereof, and a second hole between an outer circumferential surface of the reflective surface and the first hole, the collecting mirror having a first focal point close to and a second focal point far from the reflective surface, and a blocking bar disposed between the first focal point and the second focal point, wherein the blocking bar includes a first portion disposed on a first optical axis connecting the first focal point of the collecting mirror with the second focal point thereof, and a second portion disposed on a second optical axis connecting the second hole of the collecting mirror with the second focal point thereof.

In accordance with yet another aspect of embodiments, an EUV light generator includes a collecting mirror having a first focal point and a second focal point, the first focal point being closer to the collecting mirror than the second focal point, a laser to generate a laser beam and to radiate the laser beam toward the first focal point of the collecting mirror, and a droplet generator to generate a droplet and to discharge the droplet at the first focal point of the collecting mirror, wherein the collecting mirror includes a concave reflective surface facing the first focal point, a through hole through a center of the reflective surface, and a drip hole through the reflective surface, the drip hole being spaced apart and completely separated from the through hole.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
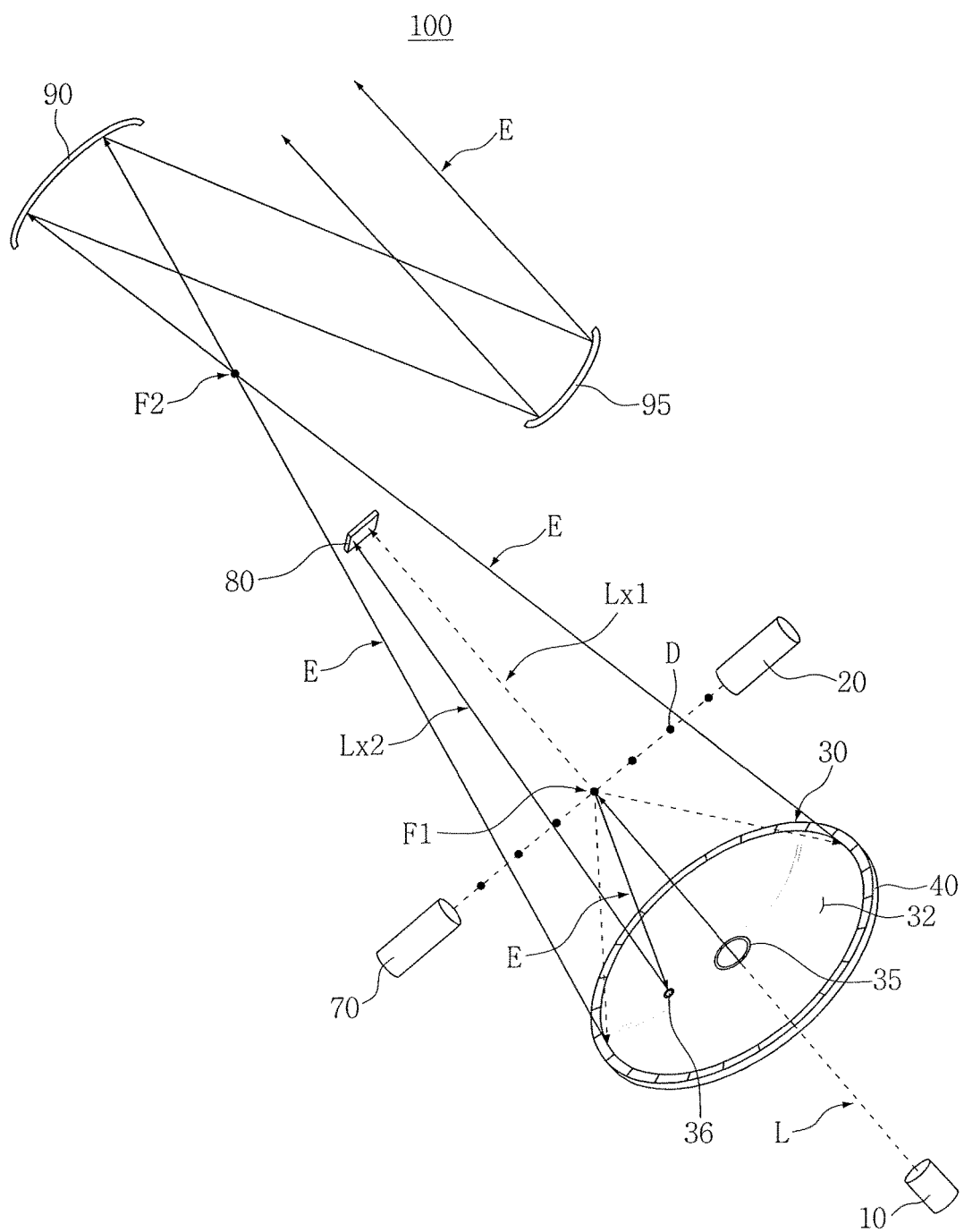
FIG. 1 illustrates a conceptual view of an extreme ultraviolet (EUV) light generator according to an embodiment.

FIG. 1 is a conceptual view illustrating an extreme ultraviolet (EUV) light generator 100 according to an embodiment. Referring to FIG. 1, the EUV light generator 100 according to the embodiment may include a laser 10, a droplet generator 20, a collecting mirror 30, a droplet collector 70, a blocking bar 80, a field mirror 90, and a pupil mirror 95.

The laser 10, for example, may generate a $CO_2$ laser or a ND:YAG laser. A laser beam L generated from the laser 10 may be radiated toward a first focal point F1 of the collecting mirror 30 from the rear surface of the collecting mirror 30. In other words, the rear surface of the collecting mirror 30 (illustrated in FIG. 2B) faces the laser 10, so the laser beam L passes from the laser 10 in a direction oriented from the rear surface of the collecting mirror 30 toward a reflective surface 32 of the collecting mirror 30 (illustrated in FIG. 2A). In this respect, it is noted that the collecting mirror 30 in FIG. 1 is illustrated schematically to clarify the structure of the reflective surface 32 and does not necessarily illustrate the orientation of the reflective surface 32 with respect to the laser 10.

The droplet generator 20 may continuously discharge, e.g., shoot, a target material made in a droplet D state toward the droplet collector 70. For example, the target material may include tin (Sn) in a liquid state. The droplet D may pass through the first focal point F1 of the collecting mirror 30. The droplet D may be exposed to the laser beam L radiated from the laser 10 at the first focal point F1 of the collecting mirror 30 and radiated to form plasma.

The droplet collector 70 may collect the droplet D exposed to and irradiated by the laser beam L. In some embodiments, the droplet collector 70 may include a magnetic material such that, e.g., remains of, the droplet D can be effectively collected.

The collecting mirror 30 may include a reflective surface 32 having a concave parabolic surface facing the blocking bar 80, and gas blowing units 40 having a circular rim shape. The collecting mirror 30 may have the first focal point F1 close to the reflective surface 32 and a second focal point F2 far from the reflective surface 32. For example, EUV light E generated at the first focal point F1 may be reflected by the reflective surface 32 of the collecting mirror 30 toward the second focal point F2. The center of the collecting mirror 30 may have a through hole 35 passing through the reflective surface 32. The laser beam L radiated from the laser 10 may pass through the through hole 35 toward the first focal point F1 of the collecting mirror 30.

The collecting mirror 30 may further include a drip hole 36 which passes through the reflective surface 32. The drip hole 36 may be disposed between the center of the collecting mirror 30 and an outer circumferential surface of the collecting mirror 30. For example, the drip hole 36 may be disposed between the through hole 35 and the lowermost end of the gas blowing units 40. Referring to FIG. 2C, the drip hole 36 may be three dimensionally, geometrically, and/or gravitationally disposed at the lowermost portion of the collecting mirror 30 normally installed inside the EUV light generator 100.

The blocking bar 80 may be disposed on the extension line of the laser beam L which is radiated from the laser 10 and passes through the through hole 35 of the collecting mirror 30. The blocking bar 80 may block some of the laser beam L, which passes the first focal point F1 of the collecting mirror 30, and the EUV light E reflected by the collecting mirror 30.

The field mirror 90 may receive and reflect the EUV light E reflected by the collecting mirror 30 to the pupil mirror 95. The pupil mirror 95 may reflect the EUV light E reflected by the field mirror 90 to an illumination system of a photolithography apparatus 1000 (see FIG. 8), e.g., an illumination mirror system 200 (see FIG. 8).

Figure 2A:
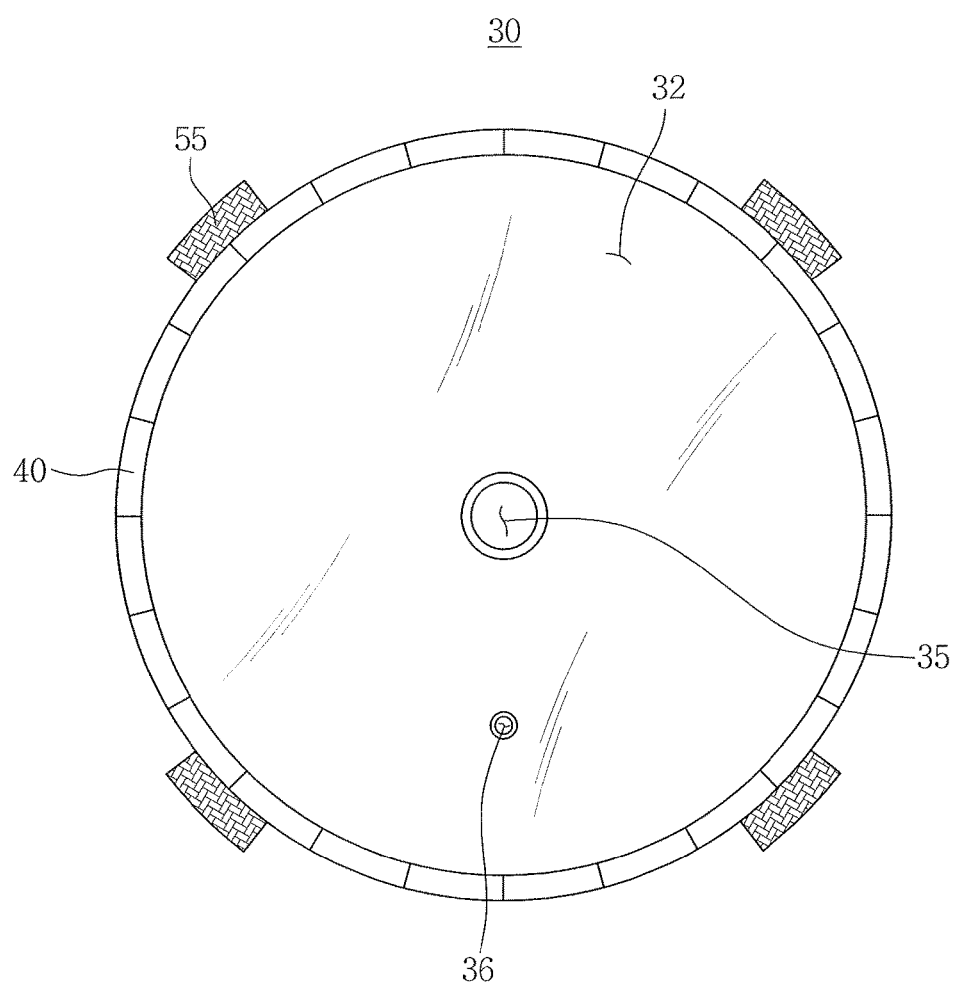
FIGS. 2A to 2C illustrate a front view, a rear view, and a side cross-sectional view, respectively, of a collecting mirror according to an embodiment.
Figure 2B:
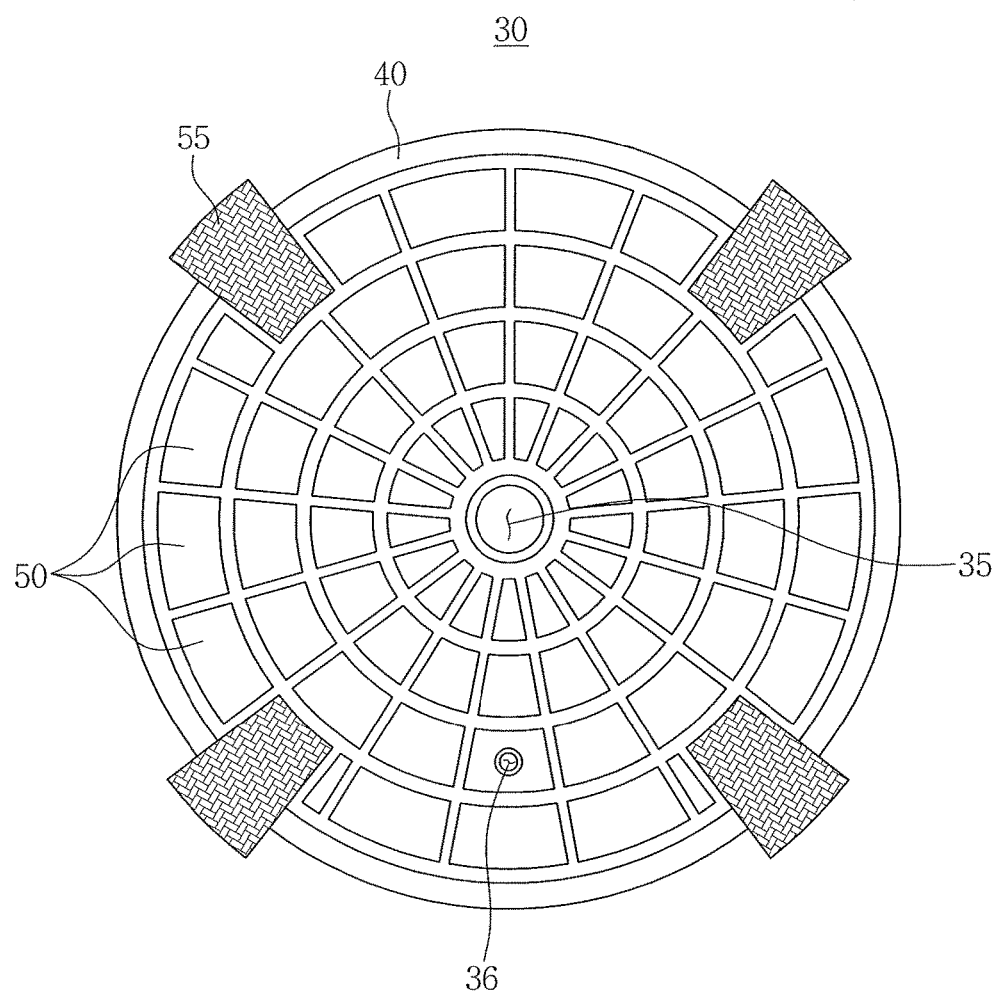
Figure 2C:
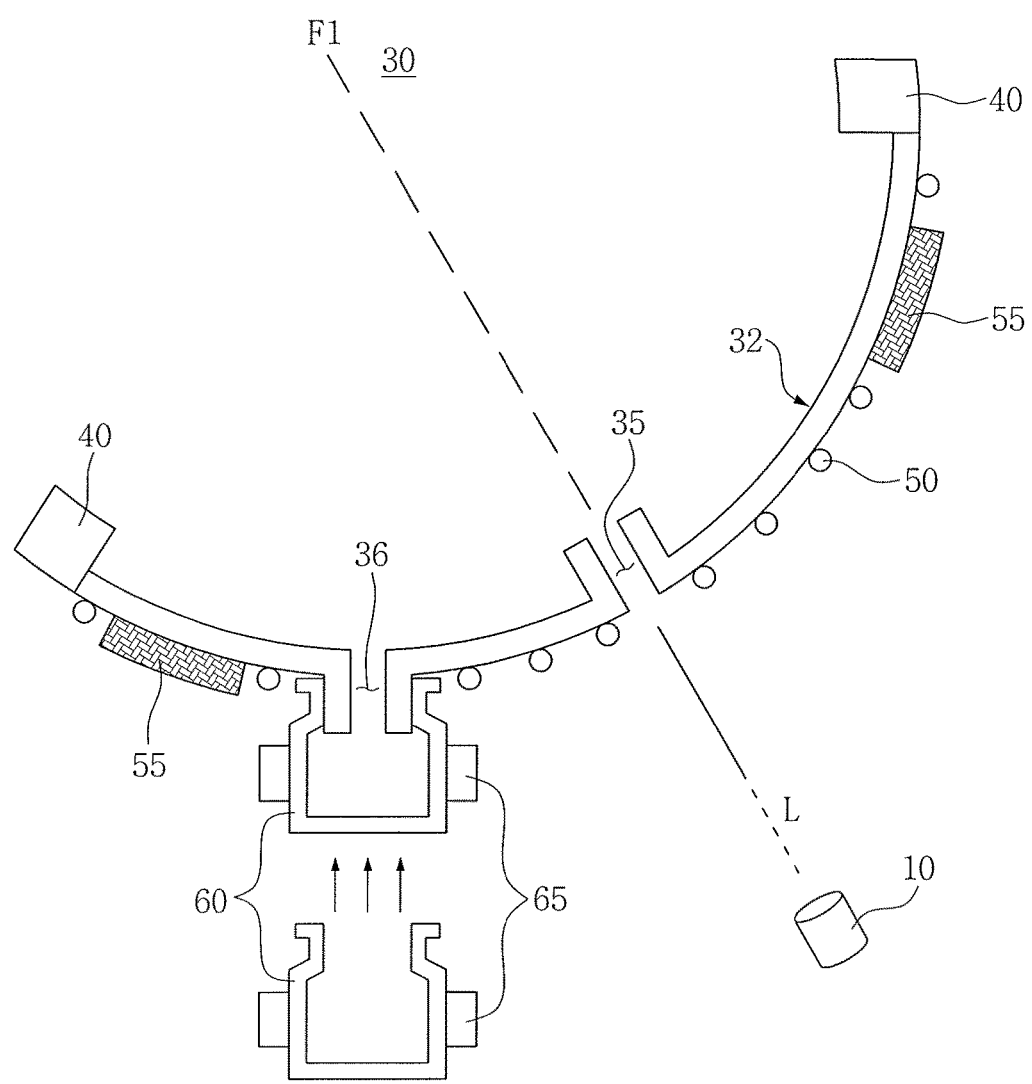

FIGS. 2A to 2C are a front view, a rear view, and a side cross-sectional view, respectively, illustrating the collecting mirror 30 according to an embodiment.

Referring to FIG. 2A, the collecting mirror 30 may include the plurality of gas blowing units 40 and vibrators 55. The gas blowing units 40 may be installed on the outer circumferential surface and may blow, e.g., hydrogen, helium, argon, nitrogen or a gas mixture thereof, or plasma onto the reflective surface 32 of the collecting mirror 30. The plasma may include hydrogen remote plasma. For example, the plurality of gas blowing units 40 may be a plurality of units adjacent to, e.g., contacting, each other to extend along the, e.g., entire, circumference of the reflective surface 32. The vibrators 55 may subject upper and lower portions and/or left and right hemispheres of the outer circumferential surface to vibrations, respectively. For example, the vibrators 55 may be positioned at equal distance from each other, e.g., four vibrators 55 may be positioned at equal distance from each other, along the circumference of the reflective surface 32. For example, the vibrators 55 may include a piezoelectric device, e.g., a piezoelectric translator (PZT) or an actuator. The vibrators 55 may subject the collecting mirror 30 to fine vibrations such that an optical arrangement is not affected.

Referring to FIG. 2B, the collecting mirror 30 may include a plurality of heaters 50 and the plurality of vibrators 55 disposed on a rear surface of the collecting mirror 30. The heaters 50 may heat the collecting mirror 30 at a temperature higher than the melting temperature of the target material. For example, the plurality of heaters 50 may be arranged adjacent to each other to overlap an entire surface of the collecting mirror 30 facing away from the blocking bar 80. For example, when the target material includes tin (Sn), the heaters 50 may heat the collecting mirror 30 at about 230° C. or more. The heaters 50 may include a heating coil. A plurality of segments which compose the heaters 50 may each be independently controlled. The vibrators 55 may be installed in upper and lower portions and/or left and right hemispheres of the rear surface of the collecting mirror 30. Accordingly, the vibrators 55 may directly subject the upper and lower portions and/or left and right hemispheres of the rear surface of the collecting mirror 30 to vibrations.

Referring to FIG. 2C, the collecting mirror 30 may include the reflective surface 32 with the concave shape to face the blocking bar 80 (in FIG. 1), while the heaters 50 may be on an opposite surface of the reflective surface 32. A reservoir 60 may be installed under the drip hole 36, the heaters 50, and the vibrators 55. The reservoir 60 may accommodate a contaminated material M heated by the heaters 50 to be melted and to flow on the reflective surface 32 of the collecting mirror 30 toward the sink hole 36. The contaminated material M may include the target material. The reservoir 60 may include a reservoir heater 65 to enclose an outer surface thereof. The reservoir heater 65 may include a heating coil, and may heat and melt the contaminated material M solidified in the reservoir 60. The reservoir 60 may be separate from the collecting mirror 30. The reservoir 60 may include one of refractory metals having a high melting temperature. In some embodiments, the reservoir heater 65 may be installed inside the reservoir 60 to melt the contaminated material M accommodated inside the reservoir 60.

Figure 3A:
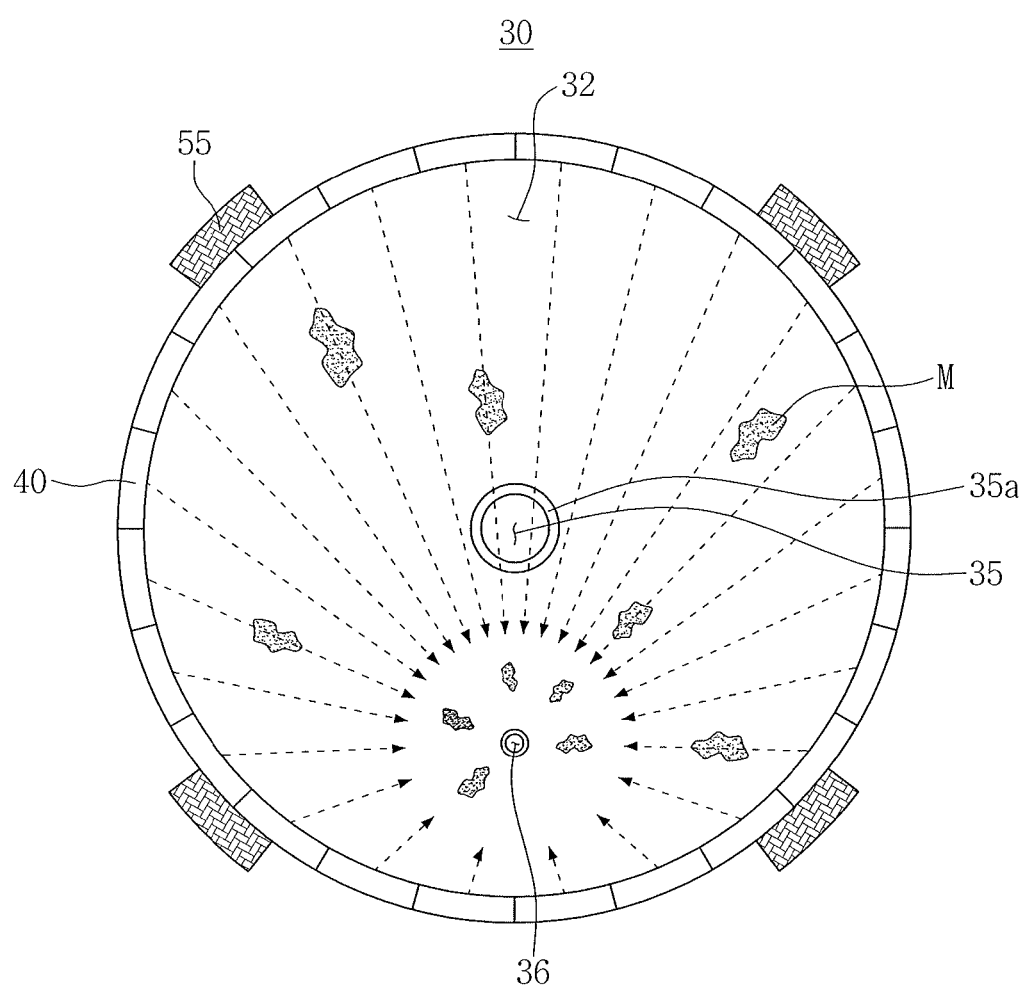
FIGS. 3A to 3C illustrate conceptual views for describing blowing gas or plasma onto a reflective surface of a collecting mirror from gas blowing units of the collecting mirror and accommodating a contaminated material remaining on the reflective surface of the collecting mirror in a reservoir.
Figure 3B:
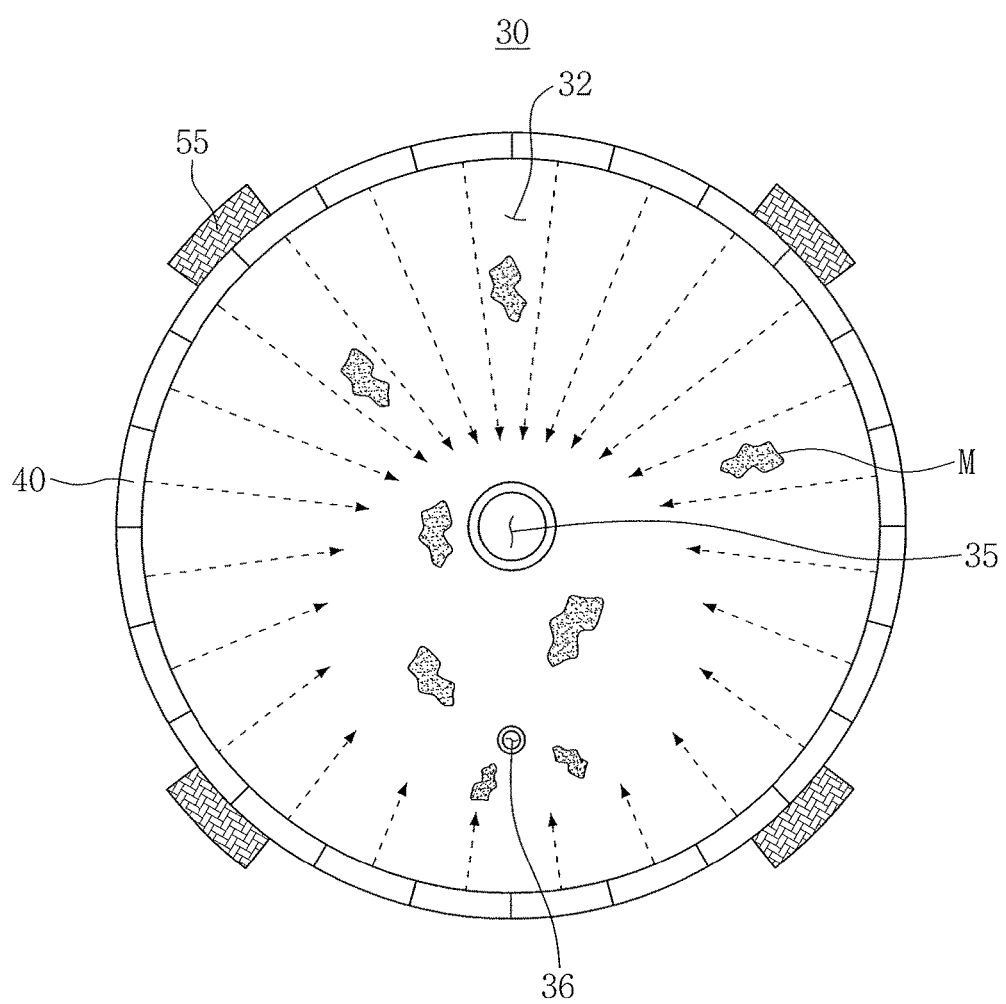
Figure 3C:
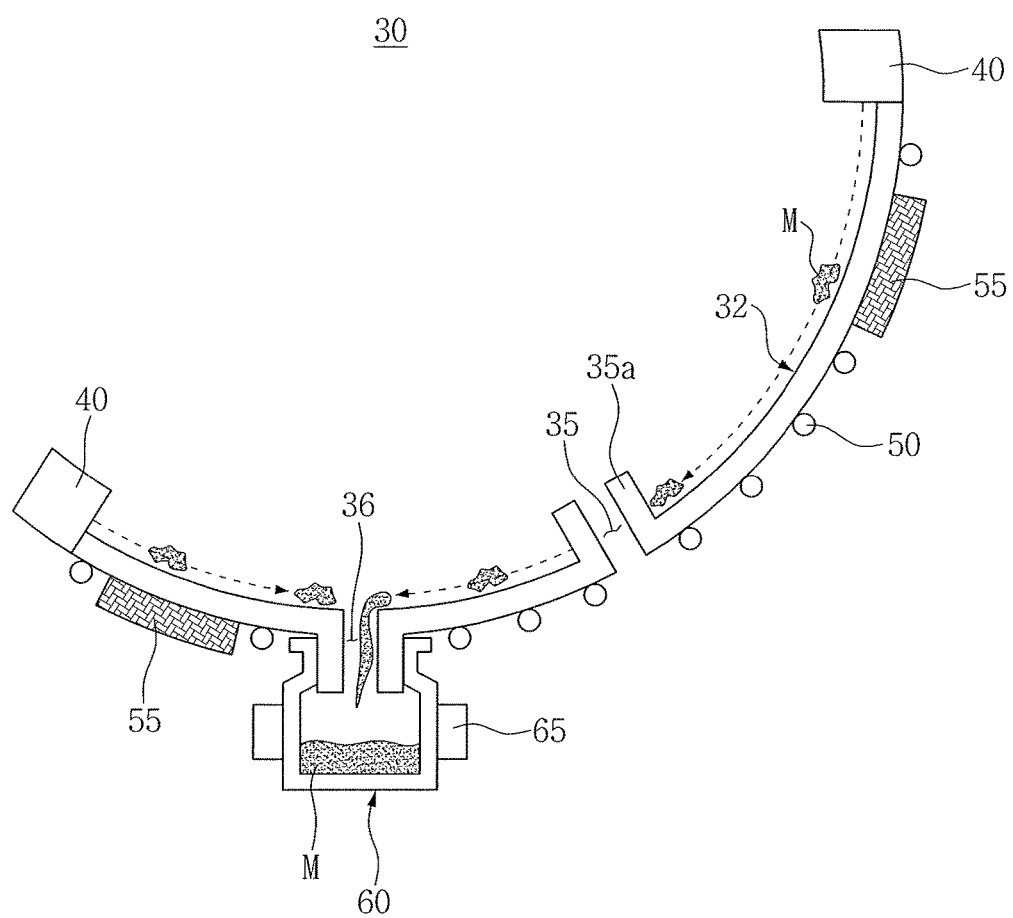

FIGS. 3A to 3C are conceptual views for describing blowing a gas or plasma onto the reflective surface 32 of the collecting mirror 30 from the gas blowing units 40 of the collecting mirror 30 and accommodating a contaminated material M remaining on the reflective surface 32 of the collecting mirror 30 in the reservoir 60. The gas blowing units 40 may be controlled as a whole or individually.

Referring to FIGS. 3A and 3C, the gas blowing units 40 may blow gas or plasma along the reflective surface 32 of the collecting mirror 30 toward the drip hole 36 of the collecting mirror 30. Referring to FIGS. 3B and 3C, the gas blowing units 40 may blow gas or plasma toward the through hole 35 of the collecting mirror 30. For example, the gas blowing units 40 disposed in an upper portion of the collecting mirror 30 may blow gas or plasma stronger than the gas blowing units 40 disposed in a lower portion of the collecting mirror 30. Accordingly, the overall flow of the gas from the gas blowing units 40 may converge at the drip hole 36 (see dashed arrows in FIGS. 3A and 3C). The vibrators 55 may be installed to protrude at an outer region of the gas blowing units 40 of the collecting mirror 30. The vibrators 55 may subject the collecting mirror 30 to vibrations. By vibrating the collecting mirror 30 by the vibrators 55 the contaminated material M on the reflective surface 32 of the collecting mirror 30 may be loosened, followed by being effectively exhausted into the drip hole 36 by the gas blown from the gas blowing units 40 to be removed by the gravity into the reservoir 60.

As further illustrated in FIG. 3C, the through hole 35 may include a sidewall 35a protruding from the reflective surface 32 toward the blocking bar 80. The sidewall 35a prevents the contaminated material M on the reflective surface 32 from falling through the through hole 35 toward the laser 10. As such, the contaminated material M flows past the through hole 35 toward the sink hole 36 to be removed into the reservoir 36.

Figure 4:
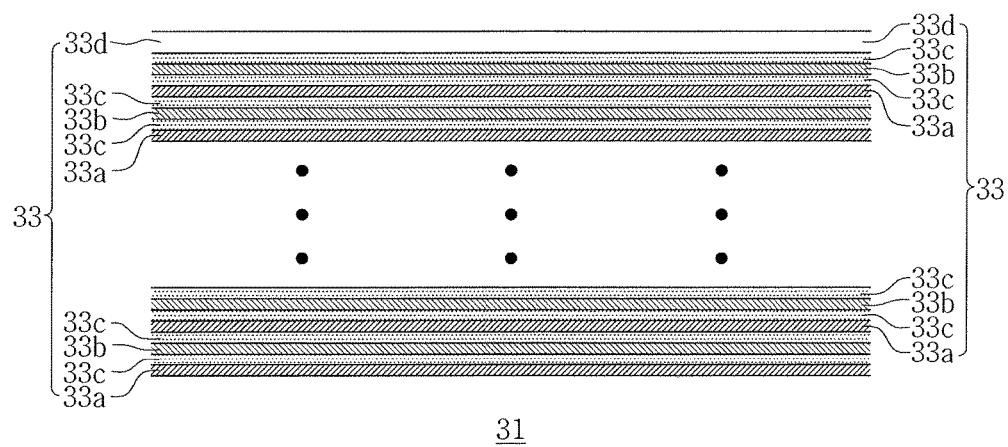
FIG. 4 illustrates a longitudinal-sectional view for conceptually describing reflective layers of a collecting mirror according to an embodiment.

FIG. 4 is a longitudinal sectional-view for conceptually describing reflective layers 33 of the collecting mirror 30 according to an embodiment. Referring to FIG. 4, the collecting mirror 30 according to the embodiment may include a mirror substrate 31 and multilayered reflective layers 33 stacked on the mirror substrate 31. The reflective layers 33 may include a first reflective layer 33a, a second reflective layer 33b, and barrier layers 33c interposed between the first reflective layer 33a and the second reflective layer 33b. The barrier layers 33c may be maintained in a stable state at a high temperature of several hundred degrees or higher. Accordingly, the barrier layers 33c may prevent diffusion or movement of the first reflective layers 33a and/or the second reflective layers 33b at high temperature and maintain the reflective layers 33.

For example, although the reflective layers 33 are in a state of high temperature by the heaters 50 heating the collecting mirror 30, the reflective ability of the collecting mirror 30 may be maintained by the barrier layers 33c. For example, the first reflective layer 33a may include molybdenum (Mo) and the second reflective layer 33b may include silicon (Si). For example, the barrier layers 33c may include a carbide material or a nitride material maintained in a stable state at high temperature. For example, the barrier layer 33c may include any one of boron carbide ($B_4C$), molybdenum carbide ($Mo_2C$), silicon carbide (SiC), silicon nitride ($Si_3N_4$), or a combination thereof. The reflective layers 33 may further include a capping layer 33d at the top thereof. The capping layer 33d may include ruthenium (Ru) or silicon oxide ($SiO_2$). The barrier layer 33c may prevent diffusion of atoms in the first reflective layer 33a and the second reflective layer 33b at high temperature. The mirror substrate 31 may include a refractory metal or a heat-resistant inorganic material.

In the embodiment, the first reflective layer 33a may have the thickness of about 2.09 nm, the second reflective layer 33b may have the thickness of about 4.14 nm, and the barrier layer 33c may have the thickness of about 0.25 nm or 0.40 nm. For example, the barrier layers 33c disposed above the first reflective layer 33a and under the second reflective layer 33b may have the thickness of about 0.25 nm, and the barrier layers 33c disposed above an upper portion of the second reflective layer 33b and under the first reflective layer 33a may have may have the thickness of about 0.40 nm. One first reflective layer 33a, one second reflective layer 33b and two barrier layers 33c may have a total thickness of about 6.88 nm. The capping layer 33d may have a thickness of about 1.70 nm.

Figure 5:
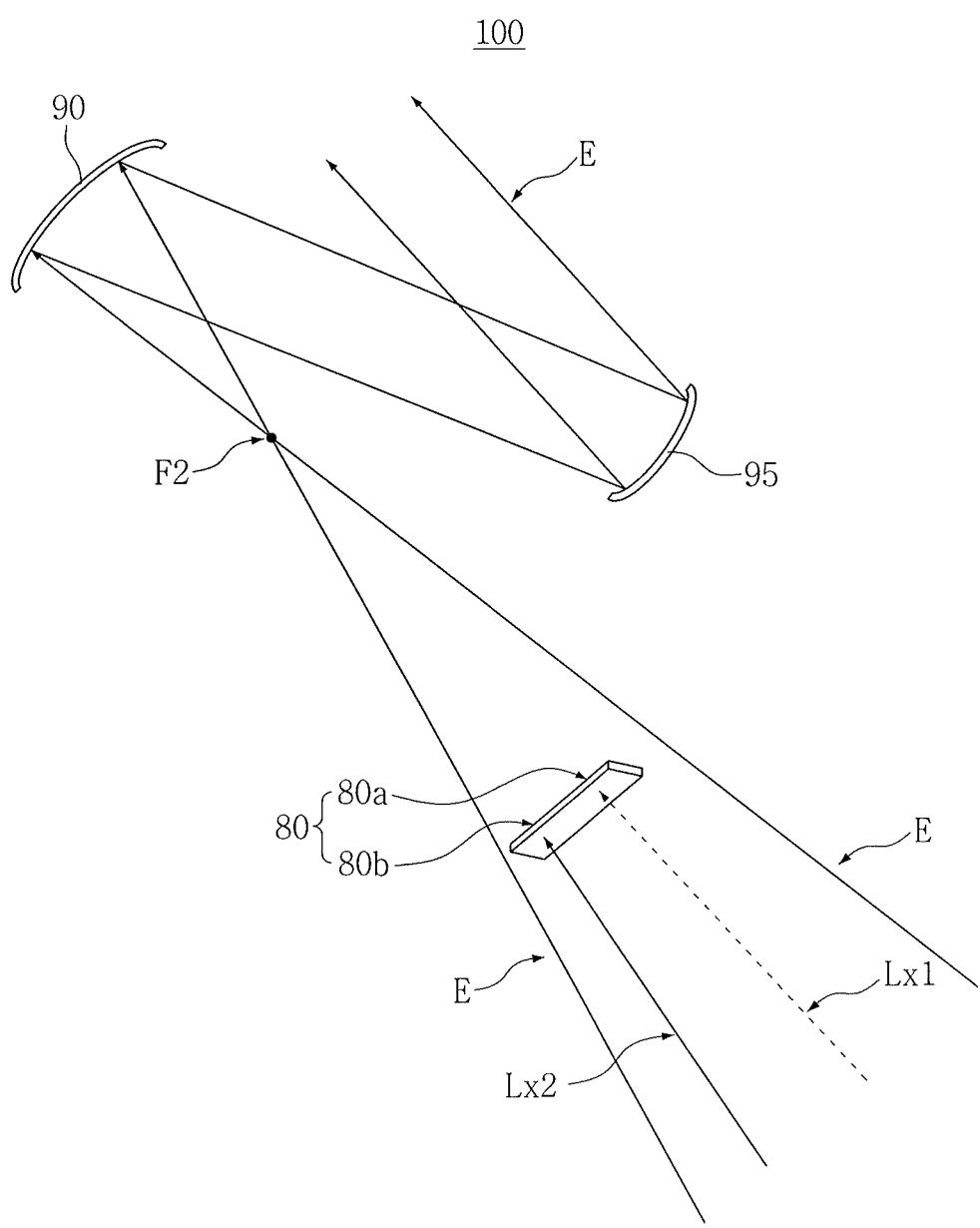
FIG. 5 illustrates a conceptual view of a blocking bar according to an embodiment.

FIG. 5 is a conceptual view illustrating the blocking bar 80 according to the embodiment. Referring to FIG. 5, the blocking bar 80 may have a vertically long bar shape to have a vertical major axis and a lateral minor axis. The blocking bar 80 is illustrated as having a rectangle or rectangular parallelepiped shape, but is not limited thereto. The blocking bar 80 may have various geometrical shapes, and may include first and second portions 80a and 80b.

In detail, the first portion 80a of the blocking bar may be disposed on a first optical axis Lx1 which connects the through hole 35 of the collecting mirror 30, the first focal point F1, and the second focal point F2 (dashed line in FIG. 1). The first portion 80a of the blocking bar 80 may prevent the laser beam L radiated from the laser 10 from being transferred to the field mirror 90. The second portion 80b of the blocking bar 80 may be disposed on a second optical axis Lx2 which connects the drip hole 36 of the collecting mirror 30 and the second focal point F2 of the collecting mirror 30. Accordingly, the second portion 80b of the blocking bar 80 may prevent an optical image of the EUV light E corresponding to the drip hole 36 of the collecting mirror 30 from being transferred to the field mirror 90. For example, as illustrated in FIGS. 1 and 5, the first and second portions 80a and 80b may be continuous with each other to define a single rectangle between the first and second focal points F1 and F2 that overlaps both the first and second optical axes Lx1 and Lx2.

Figure 6:
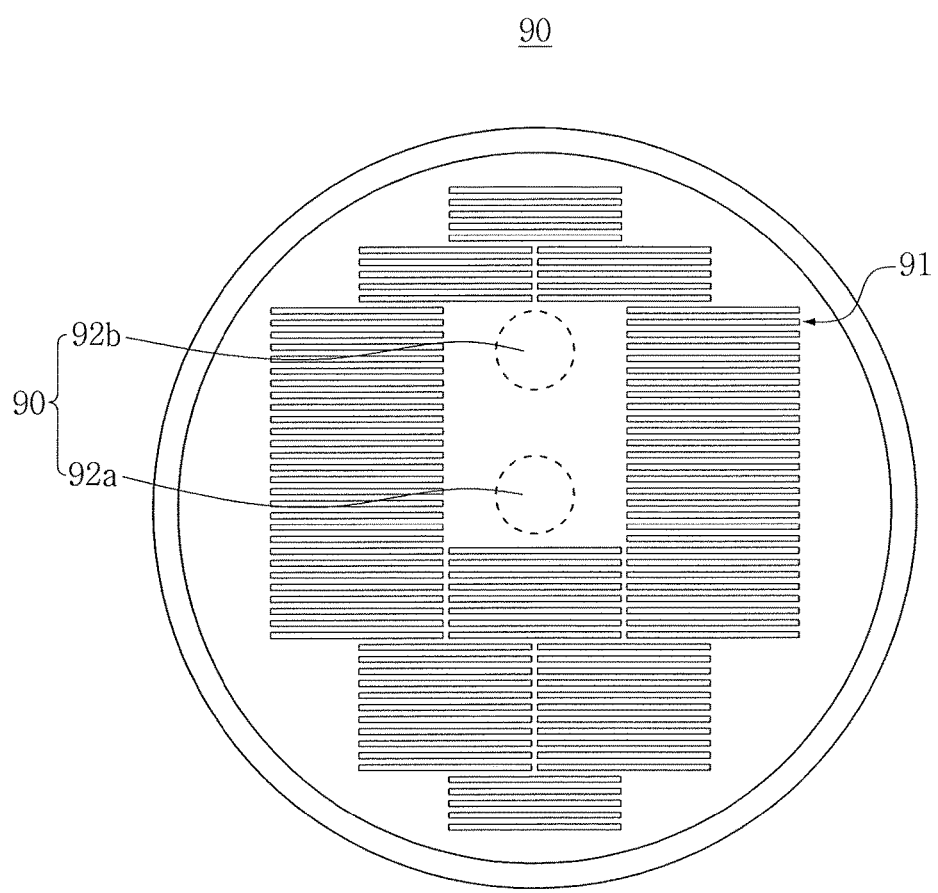
FIG. 6 illustrates a conceptual view of a field mirror according to an embodiment.

FIG. 6 is a conceptual view illustrating the field mirror 90 according to the embodiment.

Referring to FIG. 6, the field mirror 90 may include a plurality of field facet mirrors 91 arranged in a plurality of rows and columns and a blind region 92 in which the field facet mirrors 91 are not disposed. The field facet mirrors 91 may have a laterally long bar or stick shape. The field facet mirrors 91 may each have the same surface area to reflect and deliver a constant light quantity. For example, the field facet mirrors 91 may each have the same horizontal length and vertical width to have the same shape. The blind region 92 may include a central blind region 92a and an upper blind region 92b. The central blind region 92a may correspond to a region blinded by blocking the laser beam L or the EUV light E by the first portion 80a of the blocking bar 80, and the upper blind region 92b may correspond to a region blinded by blocking the EUV light E by the second portion 80b of the blocking bar 80. For example, the central blind region 92a may be disposed on the extension line of the first optical axis Lx1, which passes from the first focal point F1 to the second focal point F2 of the collecting mirror 30, and the upper blind region 92b may be disposed on the extension line of the second optical axis Lx2, which passes from the drip hole 36 of the collecting mirror 30 to the second focal point F2 of the collecting mirror 30. Since the field mirror 90 is disposed in a place farther away than that of the second focal point F2 from the first focal point F1 of the collecting mirror 30, the upper blind region 92b may be disposed above the central blind region 92a.

Figure 7:
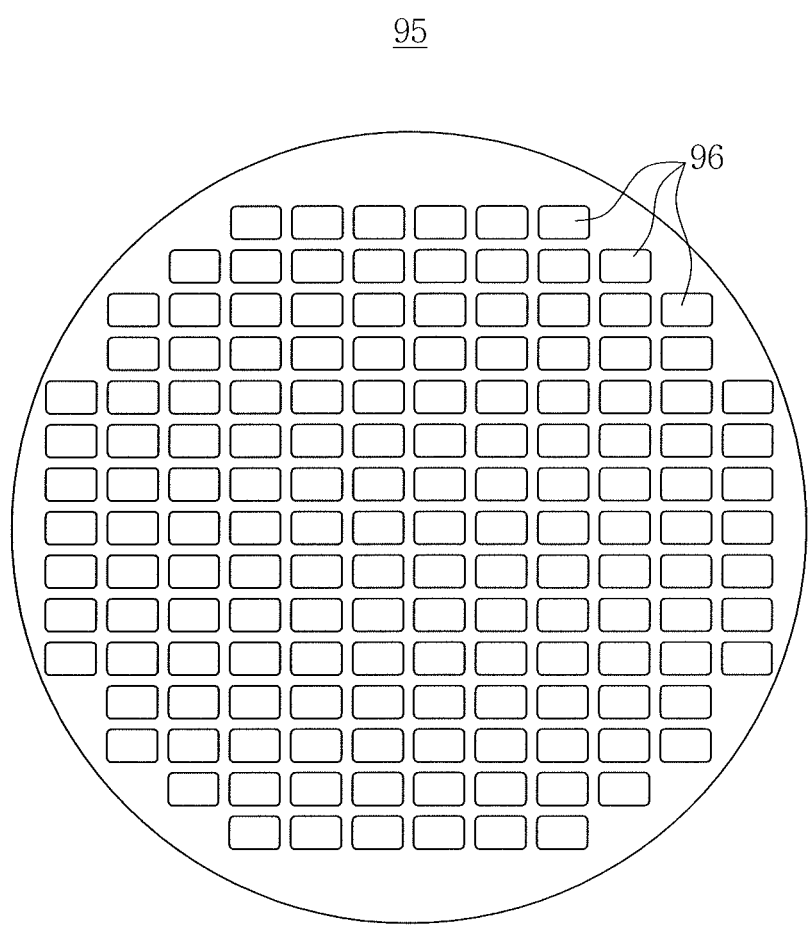
FIG. 7 illustrates a conceptual view of a pupil mirror according to an embodiment.

FIG. 7 is a conceptual view illustrating the pupil mirror 95 according to the embodiment. Referring to FIG. 7, the pupil mirror 95 may include a plurality of pupil facet mirrors 96. The pupil facet mirrors 96 may correspond to the field facet mirrors 91 of the field mirror 90, respectively. The pupil facet mirrors 96 may reflect the same light quantity so that an overall energy distribution of the EUV light E is uniform. The pupil mirror 95 may deliver the EUV light E to the illumination system of the photolithography apparatus 1000 (see FIG. 8), e.g., the illumination mirror system 200 (see FIG. 8).

Figure 8:
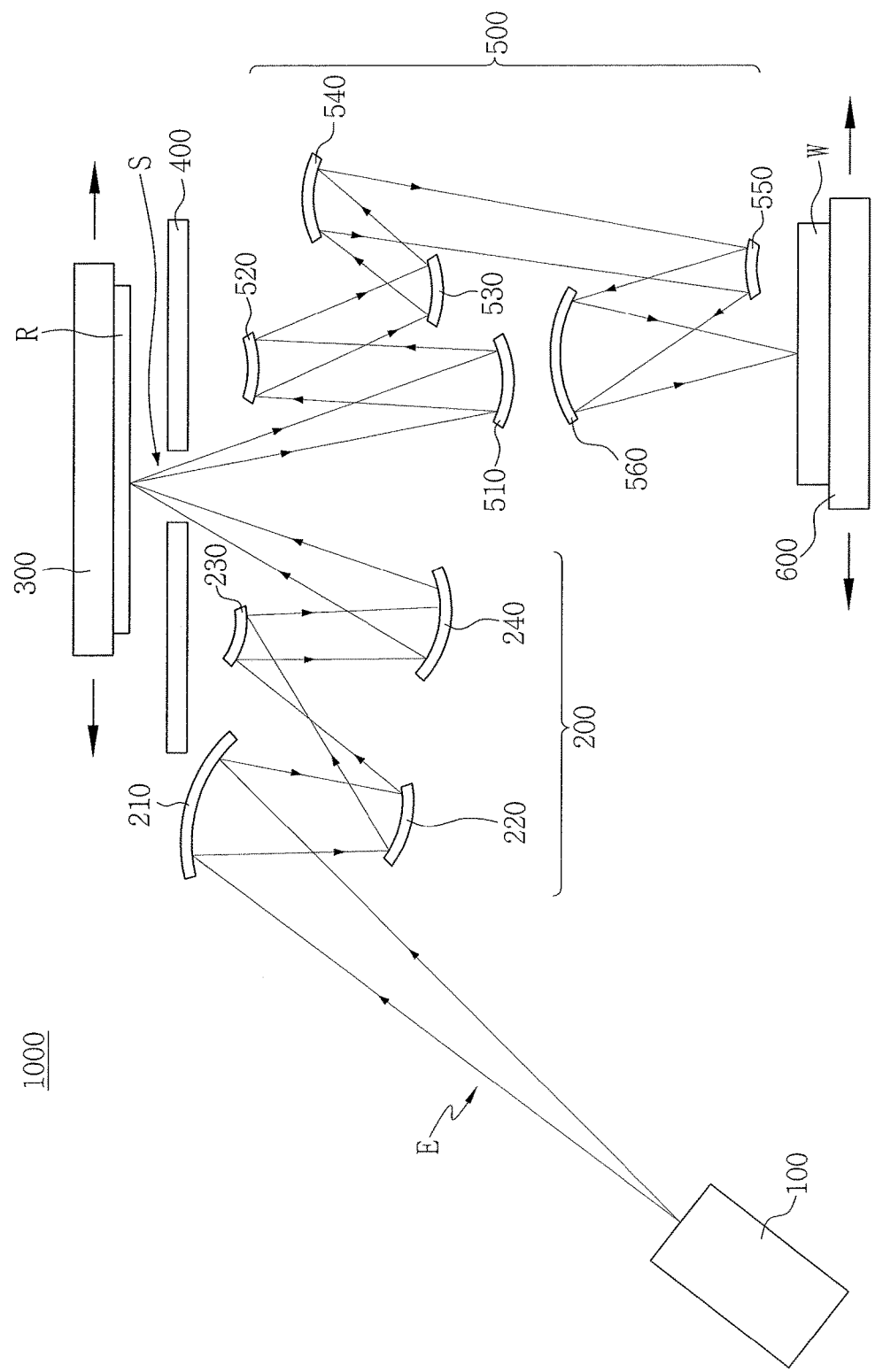
FIG. 8 illustrates a conceptual view of a photolithography apparatus according to an embodiment.

FIG. 8 is a conceptual view illustrating the photolithography apparatus 1000 according to an embodiment. Referring to FIG. 8, the photolithography apparatus 1000 having the EUV light generator 100 according to the embodiment may include the EUV light generator 100, the illumination mirror system 200, a reticle stage 300, a blinder 400, a projection mirror system 500, and a wafer stage 600. The EUV light generator 100 may include the droplet generator 20. The EUV light E generated from the EUV light generator 100 may be radiated toward the illumination mirror system 200. The illumination mirror system 200 may include a plurality of illumination mirrors 210 to 240. The illumination mirrors 210 to 240, for example, may focus and deliver the EUV light E such that a loss of the EUV light to outside the radiation path is reduced. Further, the illumination mirrors 210 to 240, for example, may overall and uniformly control an intensity distribution of the EUV light E. Accordingly, the plurality of illumination mirrors 210 to 240 may each include a concave and/or convex mirror such that a path of the EUV light E can be varied.

The reticle stage 300 may mount a reticle R on a lower surface thereof and move in a horizontal direction. For example, the reticle stage 300 may move in an arrow direction in the drawing. The reticle stage 300 may include an electrostatic chuck (ESC). The reticle R may include optical patterns on one surface thereof. The reticle R may be mounted on the lower surface of the reticle stage 300 so that optical patterns formed on a surface face downward.

The blinder 400 may be disposed under the reticle stage 300, e.g., between the reticle stage 300 and the illumination mirror system 200. The blinder 400 may include a slit S. The slit S may have an aperture shape. The slit S may form a shape of the EUV light E delivered from the illumination mirror system 200 to the reticle R of the reticle stage 300. The EUV light E delivered from the illumination mirror system 200 may pass through the slit S to radiate a surface of the reticle R on the reticle stage 300. The EUV light E reflected from the reticle R of the reticle stage 300 may pass through the slit S to be delivered to the projection mirror system 500.

The projection mirror system 500 may receive and deliver the EUV light E reflected by the reticle R and pass through the slit S to a wafer W. The projection mirror system 500 may also include a plurality of projection mirrors 510 to 560. The plurality of projection mirrors 510 to 560 may correct various aberrations. The wafer stage 600 may move in a horizontal direction. For example, the wafer stage 600 may move in an arrow direction in the drawing. In the drawing, paths in which the EUV light E travels are conceptually illustrated to easily understand embodiments.

Figure 9A:
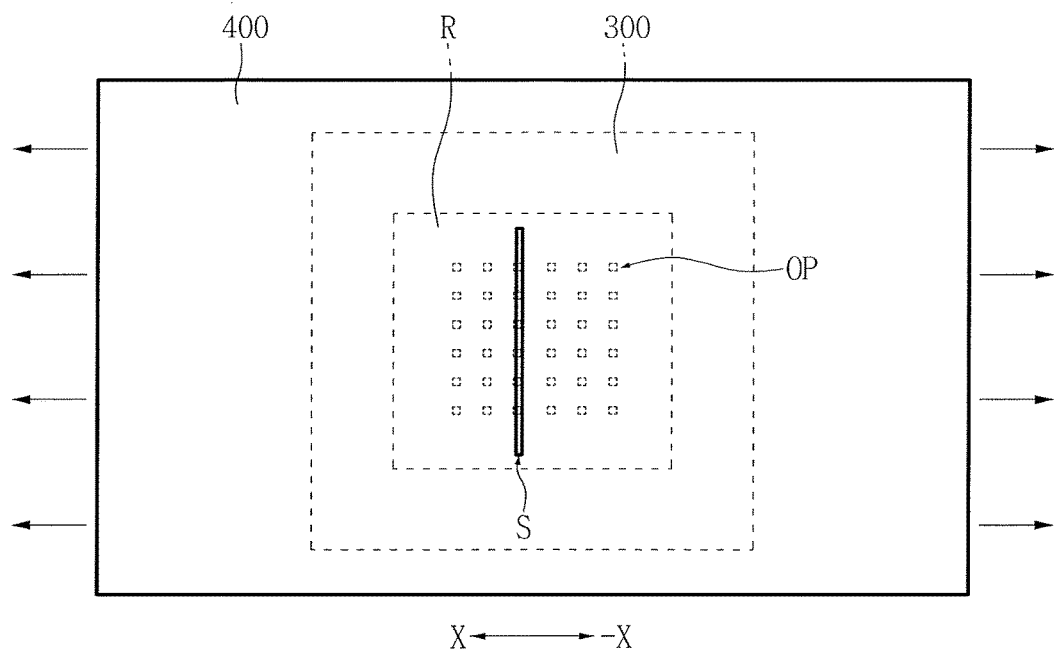
FIGS. 9A and 9B illustrate conceptual views for describing a photolithography process of forming a photoresist pattern on a wafer using a photolithography apparatus according to an embodiment.
Figure 9B:
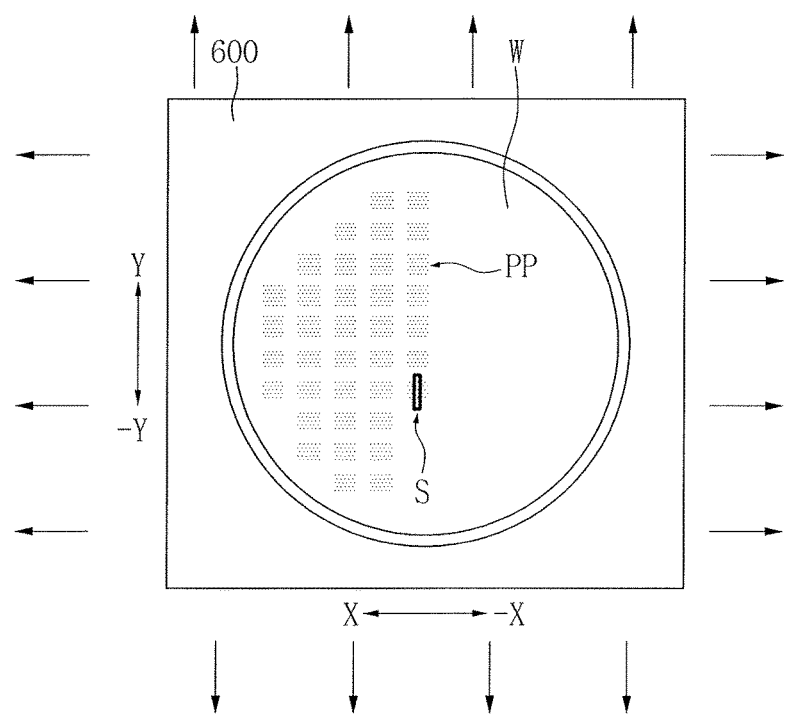

FIGS. 9A and 9B are views for conceptually describing a photolithography process of forming a photoresist pattern on the wafer W using a photolithography apparatus 1000 according to an embodiment. FIG. 9A is a bottom view of the reticle R on the reticle stage 300 shown in FIG. 8, and FIG. 9B is a top view of the wafer W.

Referring to FIGS. 8, 9A, and 9B, the photolithography process using the photolithography apparatus 1000 according to the embodiment may include generating EUV light E using the EUV light generator 100 according to the embodiment, radiating the reticle R with the EUV light E through the illumination mirror system 200 and the slit S in the blinder 400 of the photolithography apparatus 1000, and radiating the wafer W with the EUV light E reflected by the reticle R through the projection mirror system 500. Thus, a photoresist layer may be formed on the wafer W.

Referring to FIGS. 8 and 9A, the reticle stage 300 may move in an X direction (or −X direction). Accordingly, an optical pattern OP of the reticle R may be scanned through the slit S. EUV light E reflected by the reticle R may have information on an optical pattern, and may radiate a surface of the wafer W on the wafer stage 600 through the projection mirror system 500.

Referring to FIGS. 8 and 9B, the wafer stage 600 may move in an X direction (or −X direction) while the reticle stage 300 moves. The wafer stage 600 may be moved more slowly than the reticle stage 300. Accordingly, an optical pattern OP of the reticle R may be reduced, and transferred onto the wafer W. The photoresist on the wafer W may have a virtual optical pattern PP. The wafer stage 600 may move in a Y direction (or −Y direction) when the reticle stage 300 is not moved. The wafer stage 600 may determine a focal point position of the EUV light E and may be overall or partially raised or lowered.

Figure 10:
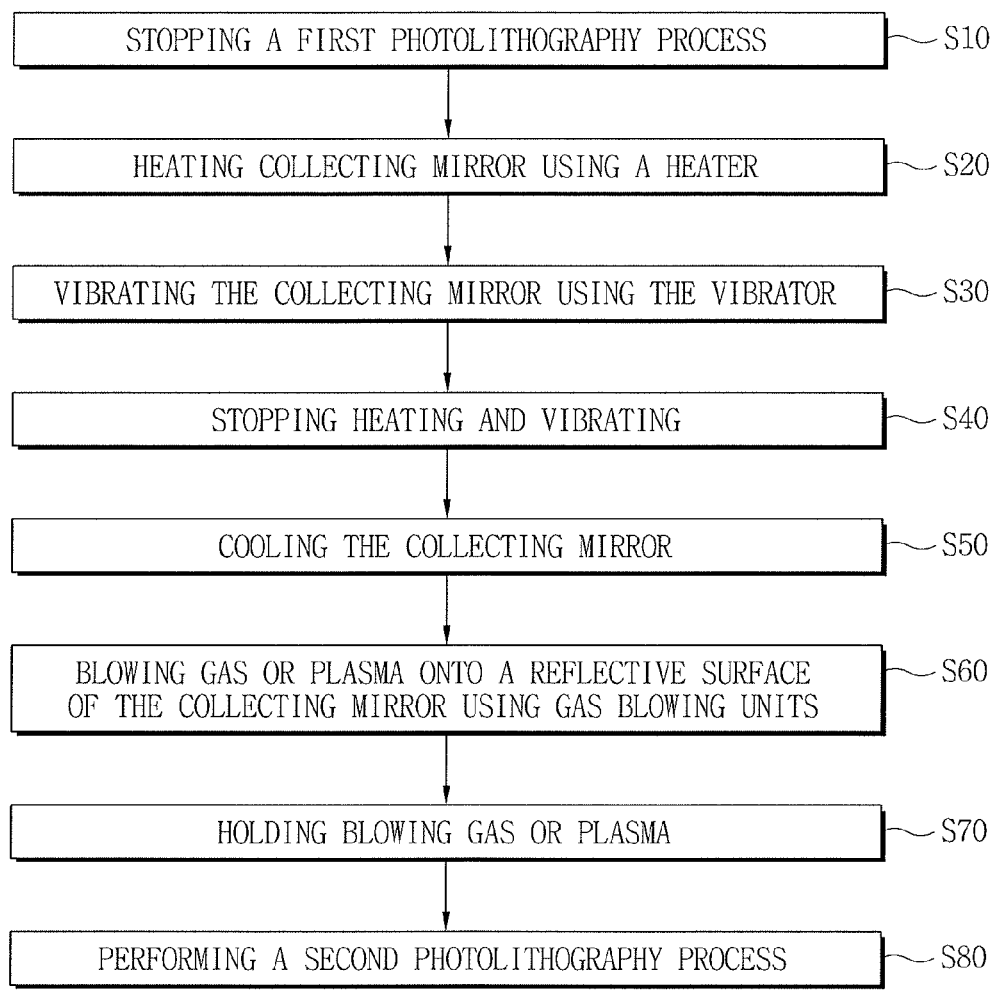
FIG. 10 illustrates a flowchart for describing a method of cleaning a collecting mirror of an EUV light generator according to an embodiment.

FIG. 10 is a flowchart for describing a method of cleaning the collecting mirror 30 of the EUV light generator 100 according to an embodiment.

Referring to FIG. 10, the method of cleaning the collecting mirror 30 of the EUV light generator 100 according to the embodiment may include stopping a first photolithography process (S10). Next, referring to FIGS. 2A to 2C and/or FIGS. 3A to 3C, the method may include heating the collecting mirror 30 using the heater 50 (S20). Heating the collecting mirror 30 heats the contaminated material M on the reflective surface 32 of the collecting mirror 30 to a temperature equal to or higher than its melting temperature using the heater 50. For example, when the contaminated material M includes tin (Sn), the collecting mirror 30 may be heated to a temperature of about 200° C. to about 500° C. The heated contaminated material M on the reflective surface 32 of the collecting mirror 30 may be melted, thereby allowing it to flow through the drip hole 36 out of the collecting mirror 30.

Next, referring to FIGS. 2A to 2C and/or FIGS. 3A to 3C, the method may include vibrating the collecting mirror 30 using the vibrator 55 (S30). Operation (S30) may be performed while continuously heating the collecting mirror 30. The vibrations of the collecting mirror 30 may facilitate flow of the melted contaminated material M toward the drip hole 36 and the reservoir 60.

Next, the above method may include stopping operation of the heater 50 and the vibrator 55 (S40). Once operation (S40) is performed, the collecting mirror 30 may be cooled to room temperature (S50).

Next, referring to FIGS. 3A to 3C, the above method may include blowing gas or plasma onto the reflective surface 32 of the collecting mirror 30 using the gas blowing units 40 (S60). The gas may include, e.g., hydrogen, helium, argon, nitrogen or a gas mixture thereof. The plasma may include, e.g., a hydrogen radical or hydrogen remote plasma. In this process, a thin contaminated material M remaining on the reflective surface 32 of the collecting mirror 30 after operation (S30) may be removed. Operation (S60) may be omitted. Then, the above method may hold blowing the gas or plasma (S70), and performing a second photolithography process (S80).

In some embodiments, a method of cleaning the collecting mirror 30 of the EUV light generator 100 according to the embodiment, e.g., compared with the above method with reference to FIG. 10, may further include accommodating the contaminated material M in the reservoir 60, separating the collecting mirror 30 from the EUV light generator 100, separating the reservoir 60 from the collecting mirror 30 and removing the contaminated material M inside the reservoir 60, coupling the reservoir 60 with the collecting mirror 30, and installing the collecting mirror 30 in the EUV light generator 100. In some other embodiments, a method of cleaning the collecting mirror 30 of the EUV light generator 100 according to the embodiment, e.g., compared with the above method with reference to FIG. 10, may further include accommodating the contaminated material M in the reservoir 60, separating the reservoir 60 from the collecting mirror 30 and removing the contaminated material M inside the reservoir 60, and coupling the reservoir 60 with the collecting mirror 30.

The EUV light generator according to embodiments includes a collecting mirror having a drip hole, thereby allowing removal of the contaminated material remaining on the collecting mirror through the drip hole. Therefore, since the contaminated material can be removed without replacing the collecting mirror, productivity of a photolithography process using the EUV light generator can be improved.

The EUV light generator according to embodiments includes the reservoir installed under the drip hole, thereby easily collecting and removing the contaminated material. Further, in the EUV light generator according to embodiments, the collecting mirror and the reservoir include heaters, thereby liquidizing and easily removing the contaminated material. In the EUV light generator according to embodiments, the collecting mirror includes gas blowing units and/or the vibrators, thereby quickly removing the contaminated material. The EUV light generator according to embodiments includes the blocking bar, thereby balancing an optical unbalance caused by the drip hole. The EUV light generator according to embodiments includes a field mirror having a blind region corresponding to the blocking bar, thereby balancing an optical unbalance caused by the drip hole or the blocking bar. Other effects, which are not described herein, have been described in the above detailed description.

By way of summation and review, elements of an EUV light generator contaminated with residue of the target material may be replaced at regular intervals to remove the residue of the target material from an interior of the EUV light generator, e.g., residue of the target material on a collecting mirror of the EUV light generator may reduce efficiency of the collecting mirror. However, replacement of elements of the EUV light generator may reduce productivity and increase costs. Therefore, according to embodiments, the residue of the target material on elements of the EUV light generator may be melted and easily removed in a short time.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An extreme ultraviolet (EUV) light generator, comprising:
   a collecting mirror having a first focal point and a second focal point, the first focal point being closer to the collecting mirror than the second focal point;
   a laser to generate a laser beam and to radiate the laser beam toward the first focal point of the collecting mirror; and
   a droplet generator to generate a droplet and to discharge the droplet at the first focal point of the collecting mirror,
   wherein the collecting mirror includes:
      a concave reflective surface,
      a through hole in a center of the reflective surface, and
      a drip hole between the through hole and an outer circumferential surface of the reflective surface.

2. The EUV light generator as claimed in claim 1, wherein the collecting mirror further comprises a plurality of gas blowing units, the gas blowing units enclosing the outer circumferential surface of the reflective surface.

3. The EUV light generator as claimed in claim 2, wherein the gas blowing units blow gas or plasma onto the reflective surface toward the through hole or the drip hole.

4. The EUV light generator as claimed in claim 3, wherein gas blowing units above the through hole or the drip hole blow the gas stronger than gas blowing units below the through hole or the drip hole.

5. The EUV light generator as claimed in claim 2, wherein each of the plurality of gas blowing units is independently controlled.

6. The EUV light generator as claimed in claim 1, further comprising a blocking bar on an extension line of a first optical axis, the first optical axis passing from the laser through the through hole of the collecting mirror and the first focal point of the collecting mirror, and the blocking bar having a vertically long bar shape to have a vertical major side and a lateral minor side.

7. The EUV light generator as claimed in claim 6, wherein the blocking bar includes a first portion overlapping the laser beam from the laser that passes through the through hole of the collecting mirror and the first focal point of the collecting mirror, and a second portion overlapping EUV light radiated from the first focal point of the collecting mirror and reflected from around the drip hole of the collecting mirror.

8. The EUV light generator as claimed in claim 7, wherein a distance between the first portion of the blocking bar and the droplet generator is smaller than a distance between the second portion of the blocking bar and the droplet generator.

9. The EUV light generator as claimed in claim 6, wherein the blocking bar includes a first portion on the first optical axis connecting the through hole of the collecting mirror with the second focal point of the collecting mirror, and a second portion on a second optical axis connecting the drip hole of the collecting mirror with the second focal point of the collecting mirror.

10. The EUV light generator as claimed in claim 1, further comprising a field mirror having a plurality of field facet mirrors, and a blind region.

11. The EUV light generator as claimed in claim 10, wherein the plurality of field facet mirrors have a lateral long bar shape or a stick shape.

12. The EUV light generator as claimed in claim 10, wherein the blind region includes a first blind region on a first optical axis extending between the first focal point and the second focal point of the collecting mirror, and a second blind region on a second optical axis extending from between the drip hole and the second focal point of the collecting mirror.

13. The EUV light generator as claimed in claim 10, further comprising a pupil mirror including a plurality of pupil facet mirrors corresponding to the plurality of field facet mirrors, respectively.

14. The EUV light generator as claimed in claim 1, wherein the collecting mirror further includes heaters on a rear surface thereof.

15. The EUV light generator as claimed in claim 1, wherein the collecting mirror further includes a reservoir under the drip hole.

16. The EUV light generator as claimed in claim 15, wherein the reservoir includes a reservoir heater to heat the reservoir.

17. The EUV light generator as claimed in claim 15, wherein the reservoir is separable from the collecting mirror.

18. The EUV light generator as claimed in claim 1, wherein the collecting mirror further includes vibrators on a rear surface thereof.

19. An extreme ultraviolet (EUV) light generator, comprising:
- a collecting mirror including:
  - a concave reflective surface,
  - a first hole in a center of the reflective surface, and
  - a second hole between an outer circumferential surface of the reflective surface and the first hole, a first focal point of the collecting mirror being closer to the reflective surface than a second focal point of the collecting mirror; and
- a blocking bar between the first focal point and the second focal point, the blocking bar including:
  - a first portion on a first optical axis connecting the first focal point of the collecting mirror with the second focal point thereof, and
  - a second portion on a second optical axis connecting the second hole of the collecting mirror with the second focal point thereof.

* * * * *